(12) United States Patent
Kaltenbach

(10) Patent No.: US 7,602,505 B2
(45) Date of Patent: Oct. 13, 2009

(54) METHOD FOR THE AUTOMATIC PARAMETERIZATION OF MEASURING SYSTEMS

(75) Inventor: Thomas Kaltenbach, Gutach-Siegelau (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 11/600,322

(22) Filed: Nov. 15, 2006

(65) Prior Publication Data

US 2007/0121122 A1    May 31, 2007

(30) Foreign Application Priority Data

Nov. 16, 2005   (DE)   ........................ 10 2005 054 658

(51) Int. Cl.
*G01B 11/14* (2006.01)

(52) U.S. Cl. ...................... 356/601; 356/625; 356/3.07; 382/154; 250/559.05

(58) Field of Classification Search ......... 356/601–625, 356/3.07; 382/154; 250/559.22, 24, 559.24, 250/559.27, 559.05

See application file for complete search history.

(56) References Cited

U.S. PATENT DOCUMENTS

| | | | | | |
|---|---|---|---|---|---|
| 4,063,820 | A | * | 12/1977 | Borgese | ........................ 356/625 |
| 4,105,925 | A | * | 8/1978 | Rossol et al. | .......... 250/559.37 |
| 4,188,544 | A | | 2/1980 | Chasson | |
| 4,323,772 | A | * | 4/1982 | Serge | .................... 235/462.19 |
| 4,677,302 | A | * | 6/1987 | Chiu et al. | ............. 250/559.22 |
| 4,701,047 | A | * | 10/1987 | Eibert et al. | ................ 356/3.07 |
| 4,929,843 | A | * | 5/1990 | Chmielewski et al. | . 250/559.05 |
| 4,979,815 | A | | 12/1990 | Tsikos | |
| 5,978,521 | A | | 11/1999 | Wallack et al. | |
| 6,064,759 | A | * | 5/2000 | Buckley et al. | ............. 382/154 |
| 6,094,269 | A | * | 7/2000 | Ben-Dove et al. | ........... 356/623 |
| 6,298,009 | B1 | | 10/2001 | Stringer | |
| 6,493,079 | B1 | * | 12/2002 | Piacentini | ................ 356/240.1 |
| 6,795,200 | B1 | | 9/2004 | Barman et al. | |
| 6,847,859 | B2 | * | 1/2005 | Nuebling et al. | ............ 700/217 |

FOREIGN PATENT DOCUMENTS

| | | |
|---|---|---|
| DE | 10122664 A1 | 5/2001 |
| DE | 10260201 A1 | 12/2002 |
| DE | 10334640 A1 | 7/2003 |
| JP | 05045128 A * | 2/1993 |
| WO | 91/08439 | 6/1991 |

* cited by examiner

*Primary Examiner*—Sang Nguyen
(74) *Attorney, Agent, or Firm*—Harness, Dickey & Pierce, P.L.C.

(57) ABSTRACT

A method for the automatic parameterization of measuring systems for the measurement of objects transported by means of a transport device, in particular volume measurement systems, wherein at least one image, which is at least one-dimensional and comprises picture elements, of a test object known at least in part to the measuring system with respect to its dimensions and located in the measuring zone of the measuring system is detected by at least one sensor for electromagnetic radiation, in particular a laser scanner, and the system parameters required for the measurement of the objects are determined from the image and the known dimensions of the test object.

12 Claims, 4 Drawing Sheets a)    b)

METHOD FOR THE AUTOMATIC PARAMETERIZATION OF MEASURING SYSTEMS

CROSS-REFERENCE TO RELATED APPLICATIONS

This application claims the benefit of German Patent Application No. 10 2005 054 658.7, filed Nov. 16, 2005. The disclosure of the above application is incorporated herein by reference.

FIELD

The present invention relates to a method for the automatic parameterization of measuring systems for the measurement of objects transported by means of a transport device, in particular volume measurement systems.

BACKGROUND

The statements in this section merely provide background information related to the present disclosure and may not constitute prior art.

An accurately and correctly set up measuring system is necessary for the exact measurement of the objects discussed. In previously known processes, a plurality of individual steps are required for the parameterization of the measuring systems which are time-consuming in part, and which are in particular therefore additionally prone to error.

SUMMARY

It is the underlying object of the present invention to provide a method which permits a fast and simple putting into operation of measuring systems of the initially named kind.

This object is satisfied by a method of the initially named kind in which at least one image, which is at least one-dimensional and comprises picture elements, of a test object known to the measuring system at least in part with respect to its dimensions and located in the measuring zone of the measuring system is detected by at least one sensor for electromagnetic radiation, in particular a laser scanner, and the system parameters required for the measurement of the objects are determined from the image and from the known dimensions of the test object.

The invention is in particular characterized in that at least one image is detected by means of a sensor of a test object whose dimensions are known at least in part and which is located in the measuring zone of the measuring system. The test object can, for example, be positioned on a transport surface of the transport device. The test object can be positioned statically in the measuring zone of the measuring system or be moved dynamically through the measuring zone of the measuring system to carry out the method in accordance with the invention. The system parameters which are necessary to subsequently correctly measure objects to be measured which are not test objects can then be calculated from the detected image and the known dimensions of the test object.

The system parameters required for the measurement can thus be determined automatically or the measuring system can be automatically set up using the method in accordance with the invention.

The sensor for electromagnetic radiation can be a laser scanner which in particular scans in a scan plane. The laser scanner scans, for example in a generally known manner, its measuring zone point-wise with at least one pulsed bundle of rays which sweeps over a predetermined angular range and is in particular reflected by points or regions of the respective object, in particular a test object, and is optionally subsequently detected by the laser scanner. The transit time of the transmitted and reflected radiation pulses or the phase shift between the transmitted and reflected radiation pulses can be used for the spacing or distance measurement. The data detected in this manner for a scan point or for a picture element can then include as coordinates the angle at which the reflection was detected and the distance of the object point. Polar coordinates of this type can then, for example, be converted into Cartesian coordinates for further processing. The picture elements detected by the laser scanner with a scan in particular produce a one-dimensional image in the sense of this application, which additionally has a depth resolution.

Alternatively, however, a camera, in particular a CCD camera and/or a line scan camera can also be used. The picture elements in particular recorded by a camera—but also by a laser scanner—can include data on optical properties of the object points, for example their reflectivity, which permit a recognition of a characteristic region of the object, in particular a test object, for example of a planar surface, in particular an upper side or longitudinal side so that the system parameters necessary for the measurement of the objects can be determined with at least partly known dimensions of the test object. A one-dimensional image without depth resolution can be recorded with a line scan camera and a two-dimensional image with a matrix camera.

In the method in accordance with the invention, a plurality of sensors, in particular sensors of different types, can also be used to detect the object, in particular a test object, from a plurality of different sides.

A parallelepiped test object or another test object having a simple geometry is preferably used.

At least a length, width, height and/or an axial direction or axis of symmetry and/or the geometrical shape of the test object is preferably known.

In the method in accordance with the invention, precisely one test object is preferably used.

Advantageous embodiments of the invention are also set forth in the dependent claims, in the description and in the drawing.

It is particularly advantageous for the image of the transport device with the test object to be detected, for an image of the transport device without a test object additionally to be detected and for the image with a test object to be compared with the image without a test object. A distinction can be made by a comparison of the images as to which picture elements are to be assigned to the test object and which picture elements are to be assigned to the transport device or other background structures, i.e. picture elements associated with the test object can be extracted. It can thereby be avoided that picture elements other than those associated with the test object are incorrectly used for the calculation of the system parameters.

In accordance with a preferred embodiment of the invention, the system parameters are determined from the gradient of a straight line formed by picture elements of the image. The straight line can, for example, be placed through selected picture elements of the image which correspond to a characteristic region of the test object. This is in particular of advantage when the characteristic region corresponds to a planar surface, in particular an upper side or longitudinal side, which extends parallel or perpendicular or at a known angle to a transport surface of the transport device. The system parameters of the measuring system can be determined, in particular by simple geometrical considerations known per se, with reference to the straight line formed by picture elements of the image and to a central axis of the sensor.

The system parameters can comprise the angle of rotation and/or the vertical spacing of the sensor from the transport device or a part of it, in particular a transport surface.

It is furthermore preferred for the test object to be positioned in a position relative to the transport device known at least in part to the measuring system and for the position of the sensor to be determined relative to the transport device or to a part of it, in particular a transport surface. The absolute position of the sensor relative to the transport device can be determined herewith. For example, the test object can be placed at a boundary of the transport device, in particular at a boundary of a transport surface of the transport device.

It is furthermore proposed in accordance with the invention that the test object is in particular moved through the measuring zone of the measuring system at a constant speed and that in particular a plurality of images of the moved test object are sequentially detected at a constant frequency. For example, the system parameters can only be determined without doubt using a single line scan camera which detects the test object only one-dimensionally and which cannot make any spacing measurements, when the orientation of the test object is known and/or not only one single image, but a plurality of images are detected for the determination of the orientation.

The transport speed of the transport device can in particular be determined from the sequentially detected images. The accuracy of an estimated or already known transport speed which includes errors or is too inaccurate can in particular be improved. For example, with a sufficiently high scan frequency of a laser scanner, it can be determined almost exactly from the images how long it takes until the test object completely passes through the scan plane covered by the laser scanner. The transport speed can then be calculated from the time detected and from the at least partly known dimensions.

Additionally or alternatively, a contour gained from the sequentially detected images and/or an angle of the test object is/are compared with the correspondingly known actual contour and/or the angle of the test object for the determination of the transport speed. In order to gain a contour and/or an angle of the test object from sequentially detected, respectively one-dimensional images, the images recorded at specific time intervals from one another can be represented by means of an estimated transport speed or by means of a transport speed determined in another manner in real space. If the estimated transport speed or the transport speed determined in another manner differs from the actual transport speed, the contour and/or the angle gained from the sequentially detected images is/are shown distorted with respect to the actual contour and/or angle. It is then possible to calculate back to the actual transport speed from the distortion.

Furthermore, it is proposed in accordance with the invention that a plurality of sensors are used, that a plurality of images of the moved test object are detected sequentially by each sensor and a contour of the test object is gained for each sensor from the sequentially detected images, that the contours of the sensors are combined and the position or positions of the sensors relative to one another is/are determined from the combination of the contours of the sensors.

Furthermore, in accordance with the invention, a border of the measuring zone of the measuring system can in particular be fixed in an automated manner by positioning the test object at the corresponding border.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
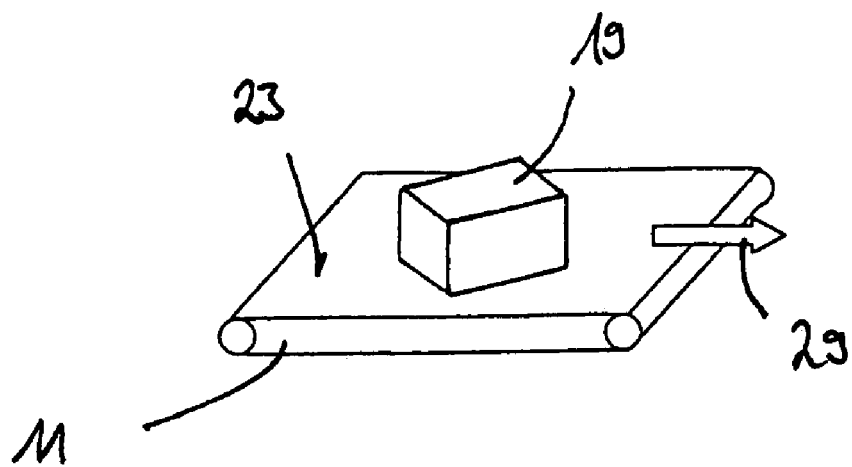
FIG. 1 illustrates a test object on a transport device.

The following description is merely exemplary in nature and is not intended to limit the present disclosure, application, or uses. It should be understood that throughout the drawings, corresponding reference numerals indicate like or corresponding parts and features.

A transport device 11, in particular a transport belt, is shown in FIG. 1. A parallelepiped test object 19 lies on the transport surface 23 of the transport device 11, i.e. on the upper side of the transport belt, and its dimensions, i.e. length, height and width are known and it is transported along a transport direction 29 by means of the transport device 11. The longitudinal axis of the test object 19 can be aligned in a rotated manner with respect to the transport direction 29, as is shown in FIG. 1. Furthermore, a laser scanner is provided, not shown in FIG. 1, which scans in a scan plane and which detects a one-dimensional depth-resolved image of the test object 19 and/or of the transport device 11 per scan.

Figure 2:
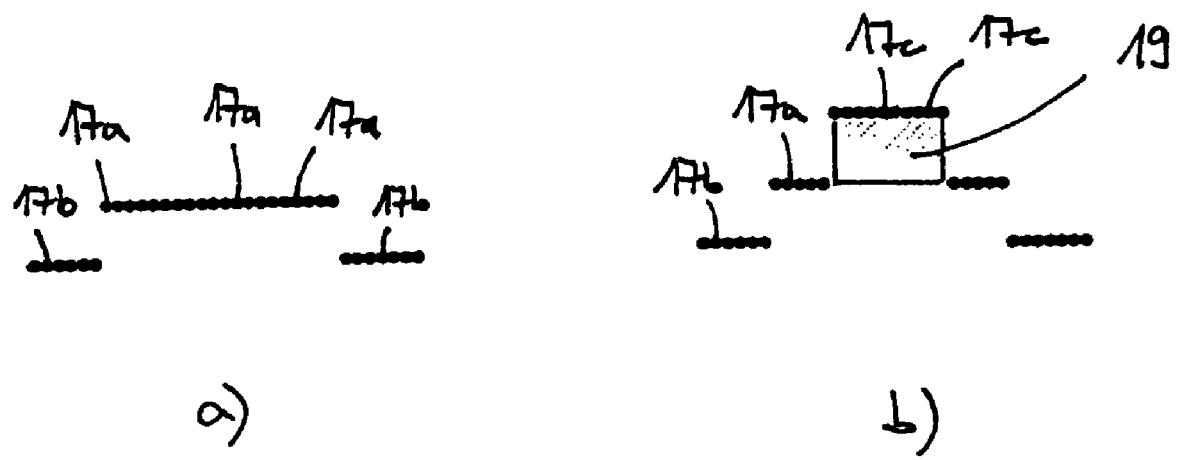
FIG. 2 illustrates images of a transport device with and without a test object detected by a laser scanner.

In FIG. 2a, a one-dimensional depth-resolved image of the transport device without a test object is shown which comprises a plurality of picture elements 17 and which was taken by a laser scanner, also not shown in FIG. 2, which is attached, only by way of example, approximately perpendicular above the transport device 11. The picture elements designated by 17a correspond to points or regions on the transport surface of the transport device. The picture elements designed by 17b correspond to points or regions which are disposed next to the transport surface.

FIG. 2b shows a later time at which a test object 19 is located on the transport surface in the measuring zone of the laser scanner. The picture elements designated by 17a and 17b correspond to points or regions analog to FIG. 2a. The picture elements designated by 17c correspond to points or regions on the upper side of the test object 19. Background structures detected by the laser scanner can be eliminated by a comparison of the image in accordance with FIG. 2b with the image in accordance with FIG. 2a so that ultimately the picture elements bounding the test object 19 can be extracted and subsequently evaluated.

Figure 3:
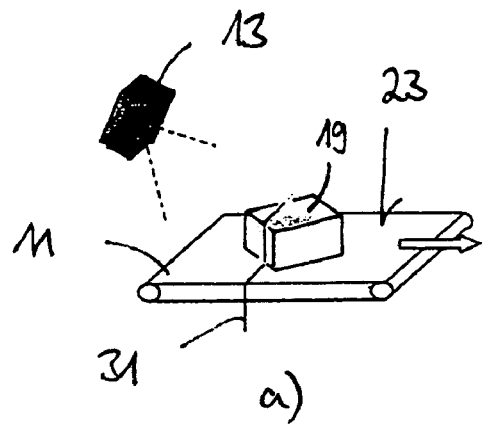
FIG. 3 illustrates the arrangement of FIG. 1 with a laser scanner and depth-resolved one-dimensional images detected by the laser scanner.
Figure 3:
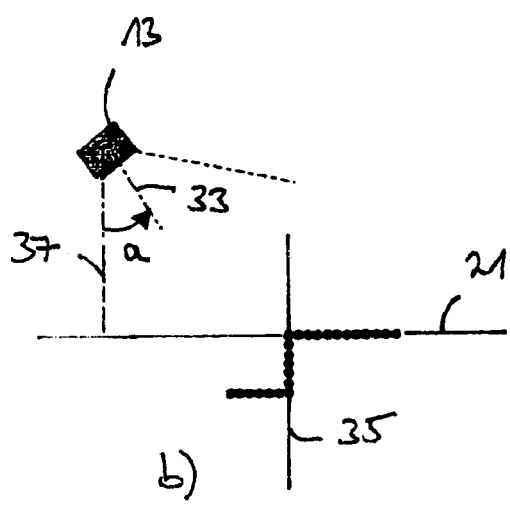
Figure 3:
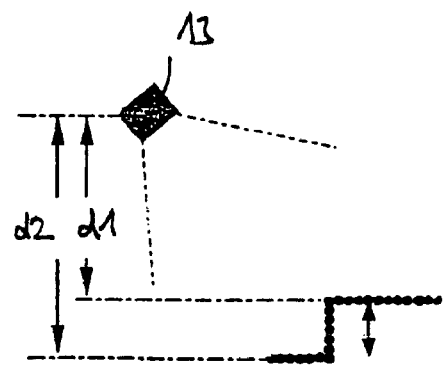

In the measuring system in accordance with FIG. 3, the laser scanner 13 is not perpendicular over the transport surface 23, but is tilted laterally thereto. FIG. 3a shows the corresponding scan line 31 which is scanned during a scan by the laser scanner 13. Picture elements which correspond to the upper side of the test object 19 extending parallel to the transport surface 23 of the transport device 11 form a straight line 21, with a perpendicular 37 to the straight line 21 being inclined at an angle of rotation a with respect to a central axis 33 of the laser scanner 13 (FIG. 3b). Correspondingly, picture elements which correspond to a longitudinal side of the test object 19 extending parallel to the vertical on the transport surface 23 form a straight line 35 which extends parallel to the perpendicular 37 and is consequently likewise inclined at the angle of rotation a with respect to the central axis 33. The angle of rotation a which can be read from the image in accordance with FIG. 3b defines the lateral tilt of the laser scanner 13 with respect to the transport surface 23.

In addition to the angle of rotation a, the vertical spacing d1 of the laser scanner 13 from the upper side of the test object or the vertical spacing d2 of the laser scanner 13 from the transport surface can be determined from the image in accordance with FIG. 3b by means of geometrical considerations which are simple and therefore not explained in any more detail here (FIG. 3c). The angle of rotation a and the vertical spacing d2 represent system parameters which permit an automatic parameterization of the measuring system and thus a measurement, in particular a volume determination, of following objects which are transported by means of the transport device 11 and whose dimensions are not known.

Figure 4:
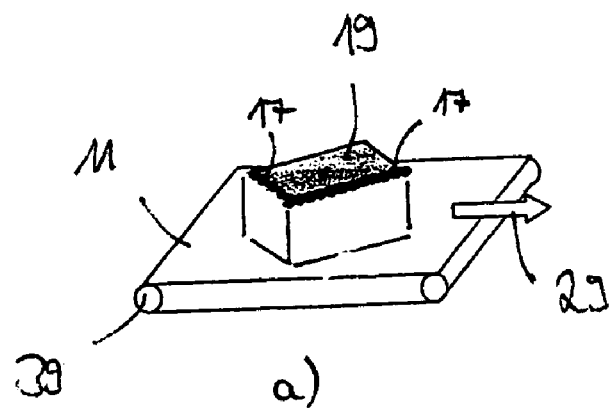
FIG. 4 illustrates the arrangement of FIG. 1 and a distorted contour of the test object gained from sequentially detected images and the associated corrected contour.
Figure 4:
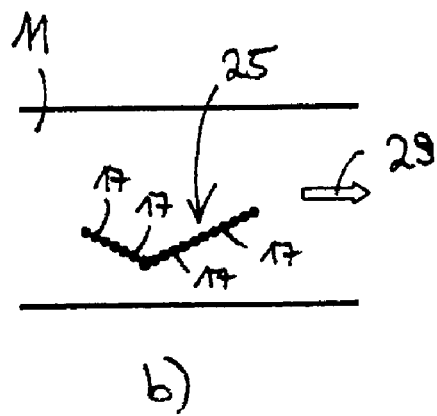
Figure 4:
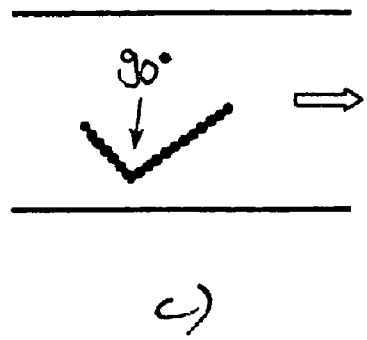

The test object 19 is moved in accordance with FIG. 4a at a constant speed v along the transport direction 29 through the measuring zone of the measuring system, i.e. the scan plane of the laser scanner 13, with an incremental encoder, in particular a rotational pulse encoder, not shown, being attached in a return shaft 39 of the transport device 11, by means of which a transport speed v' can be determined which corresponds approximately, but not usually exactly, to the actual speed v.

Furthermore, a plurality of images of the test object 19 are sequentially detected at a constant scan frequency, with the images of different sections of the test object 19 equidistant in the transport direction 29 being detected due to the movement of the test object 19.

A two-dimensional image of the test object 19 can be prepared from the scan frequency and from the transport speed v' determined with the aid of the incremental encoder. In FIG. 4b, an image calculated in this manner is shown in a plan view, with only those picture elements 17 being shown, however, which correspond to one of the two edges of the parallelepiped test object 19 covered by picture elements 17 in FIG. 4a. The picture elements 17 shown in FIG. 4b consequently represent a contour 25 of the test object 19.

Since, however, the speed v' used for the calculation of the image in accordance with FIG. 4b does not exactly correspond to the actual speed v, the contour 25 of the image in accordance with FIG. 4b is distorted with respect to the corresponding actual contour of the test object 19. It is namely known due to the parallelepiped shape of the test object 19 that the actual angle between the two edges covered with picture elements 17 in FIG. 4a should include an angle of 90° in plan view. On the preparation of the two-dimensional image of the test object 19, a transport speed is therefore selected or calculated which results in an image in accordance with FIG. 4c in which the edges of the test object 19 gained from the sequentially detected images include an angle of 90°. The speed selected or calculated in this manner then corresponds to the actual transport speed v.

Figure 5:
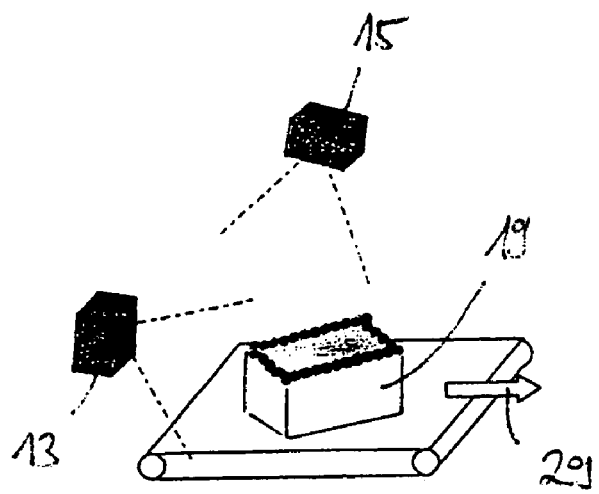
FIG. 5 illustrates the arrangement of FIG. 1 with two laser scanners and the depth-resolved one-dimensional images in each case detected by the laser scanners.
Figure 5:
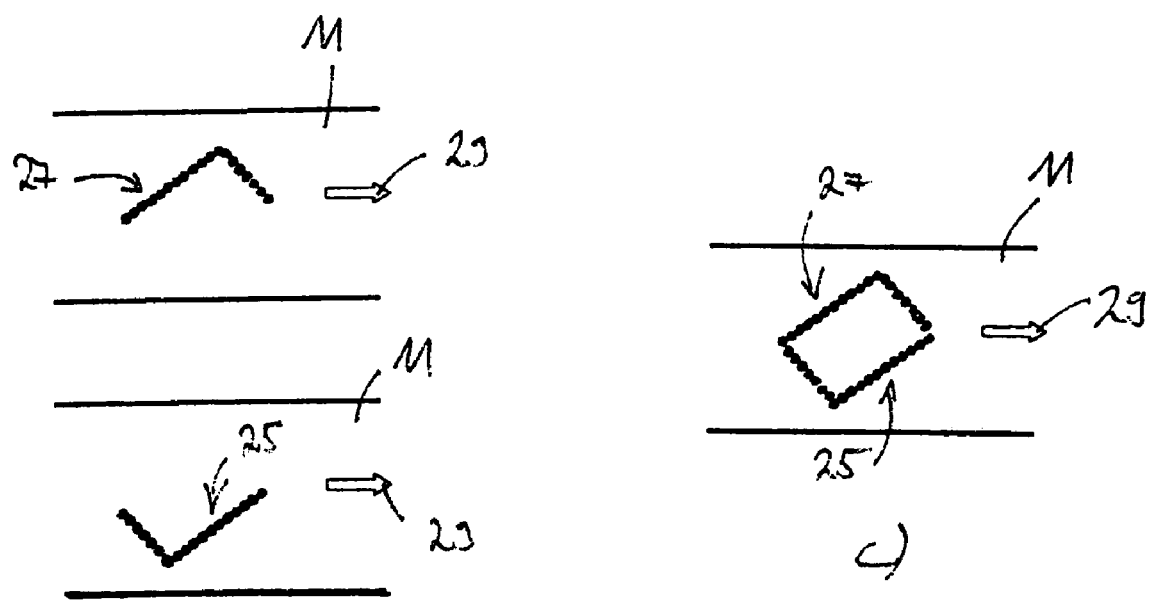

A measuring system having a plurality of laser scanners 13, 15, in particular two laser scanners, is shown in FIG. 5a. With such a measuring system, a contour can be determined by each sensor 13, 15 which, as explained above, is gained from sequentially detected images and is distorted in accordance with FIG. 4b or correct in accordance with FIG. 4c. In FIG. 5b, such contours 25, 27 are shown, with the upper contour being determined by the laser scanner 15 and the lower contour being determined by the laser scanner 13. If the two contours 25, 27 are combined, as shown in FIG. 5b, to image the four edges of the upper side of the test object 19 in a closed manner, the position of the sensors 13, 15 relative to one another can be determined from this. It can in particular be necessary for this purpose for the time relationship of the scans of the individual scanners 13, 15 to one another to be known.

With the method in accordance with the invention explained above, images can be recorded continuously, in particular before the test object 19 enters into the measuring zone of the laser scanner 13, 15, while the test object 19 passes through the measuring zone and after the test object 19 has left measuring zone.

The description of the invention is merely exemplary in nature and thus, variations that do not depart from the gist of the invention are intended to be within the scope of the invention. Such variations are not to be regarded as a departure from the spirit and scope of the invention.

REFERENCE NUMBER LIST 11 transport device
13 sensor
15 sensor
17 picture element
19 test object
21 straight line
23 transport surface
25 contour
27 contour
29 transport direction
31 scan line
33 central axis
35 straight line
37 perpendicular
39 return shaft
a angle of rotation
d1 vertical spacing
d2 vertical spacing

What is claimed is:

1. A method for automatic parameterization of measuring systems for the measurement of objects transported by means of a transport device (11), comprising:
   moving a test object through a measuring zone of the measuring system;
   sequentially detecting a plurality of images of the test object;
   determining a transport speed of the transport device from the plurality of images, wherein at least one of a contour (25, 27) gained from the plurality of the images and an angle of the test object (19) is compared with a corresponding at least one of a known actual contour and a known angle of the test object (19) for the determination of the transport speed;
   detecting at least one image using a sensor for electromagnetic radiation, wherein said at least one image is at least one-dimensional and comprises picture elements (17) of the test object (19) known at least in part to the measuring system with respect to its dimensions and located in a measuring zone of the measuring system;

determining parameters associated with the sensor which are required for the measurement of objects from the image and the known dimensions of the test object (19); and storing the parameters in a memory device of the measurement system.

2. A method in accordance with claim 1, further comprising:

detecting an image of the transport device (11) with the test object (19);

detecting an image of the transport device (11) without the test object using said at least one sensor (13, 15); and comparing the image with the test object (19) with the image without the test object.

3. A method in accordance with claim 1, wherein the system parameters are determined from a gradient of a straight line (21, 35) formed by picture elements (17) of the image.

4. A method in accordance with claim 1, wherein the system parameters include at least one of an angle of rotation and a vertical spacing of said at least one sensor (13, 15) from the transport surface (23) of the transport device (11).

5. A method in accordance with claim 1, wherein the test object (19) is positioned in a position relative to the transport device (11) known to the measuring system at least in part, and wherein a position of the sensor (13, 15) is determined relative to the transport surface (23) of the transport device (11).

6. A method in accordance with claim 1, wherein a border of the measuring zone of the measuring system is fixed in an automated manner by positioning the test object (19) at a corresponding border.

7. A method in accordance with claim 1, wherein precisely one test object (19) is used.

8. A method in accordance with claim 1, wherein the system parameters are determined from a gradient of a straight line (21, 35) formed by picture elements (17) of the image.

9. A method for automatic parameterization of measuring systems for the measurement of objects transported by means of a transport device (11), comprising:

detecting at least one image using a sensor for electromagnetic radiation, wherein said at least one image is at least one-dimensional and comprises picture elements (17) of a test object (19) known at least in part to the measuring system with respect to its dimensions and located in a measuring zone of the measuring system;

determining parameters associated with the sensor which are required for the measurement of objects from the image and the known dimensions of the test object (19);

storing the parameters in a memory device of the measurement system;

moving the test object through a measuring zone of the measuring system;

sequentially detecting a plurality of images of the moved test object (19) using a plurality of sensors (13, 15);

determining a contour (25, 27) of the test object (19) from the sequentially detected images for each sensor (13, 15);

combining the contours (25, 27) of the sensors (13, 15); and determining positions of the sensors (13, 15) relative to one another based on the combination of the contours (25, 27) of the sensors (13, 15).

10. A method in accordance with claim 9, further comprising:

detecting an image of the transport device (11) with the test object (19);

detecting an image of the transport device (11) without the test object using said at least one sensor (13, 15); and comparing the image with the test object (19) with the image without the test object.

11. A method in accordance with claim 9, wherein the system parameters include at least one of an angle of rotation and a vertical spacing of said at least one sensor (13, 15) from a transport surface (23) of the transport device (11).

12. A method in accordance with claim 9, wherein the test object (19) is positioned in a position relative to the transport device (11) known to the measuring system at least in part, and wherein a position of the sensor (13, 15) is determined relative to a transport surface (23) of the transport device (11).

* * * * *